US004001711B2

United States Statutory Invention Registration [19]

[11] Reg. Number: H1711

Smith, III

[45] Published: Feb. 3, 1998

[54] HERBICIDAL MIXTURES

[75] Inventor: William Francis Smith, III, Elkton, Md.

[73] Assignee: E. I. du Pont, Wilmington, Del.

[21] Appl. No.: 794,581

[22] Filed: Feb. 3, 1997

[51] Int. Cl.[6] ..... A01N 47/28

[52] U.S. Cl. ..... 504/116

[58] Field of Search ..... 504/136, 139

[56] References Cited

U.S. PATENT DOCUMENTS 4,547,215 10/1985 Wolf ..... 71/92

4,818,275 4/1989 Theodoridis ..... 71/92

*Primary Examiner*—Charles T. Jordan

*Assistant Examiner*—Meena Chelliah

*Attorney, Agent, or Firm*—Theodore C. Gregory

[57] ABSTRACT

This invention relates to herbicidal mixtures of chlorimuron ethyl and sulfentrazone, herbicidal compositions of said mixtures, and a method for the use of said mixtures to control undesired vegetation.

5 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HERBICIDAL MIXTURES

FIELD OF THE INVENTION

The present invention relates to mixtures of herbicides that have a synergistic effect on weeds.

BACKGROUND OF THE INVENTION

The control of undesired vegetation is extremely important in achieving high crop efficiency. This can be achieved by the selective control of the growth of weeds in such useful crops as soybean, among others. Unchecked weed growth in such useful crops can cause significant reduction in productivity and thereby result in increased costs to the consumers. The need for finding products that achieve such results continues to be commercially important.

Combinations of herbicides are typically used to broaden the spectrum of plant control or enhance the level of control of any given species through additive effect. Certain rare combinations surprisingly give a greater-than-additive or synergistic effect. Such a valuable combination has now been discovered.

WO 94/09629 discloses mixtures of sulfonylureas and triazolinones, but does not disclose the mixtures of this invention. U.S. Pat. Nos. 4,547,215 and 4,818,275 disclose Formula I compounds and the Formula II compound, respectively, but do not disclose the mixtures of this invention.

SUMMARY OF THE INVENTION

This invention relates to mixtures of the sulfonylurea of Formula I

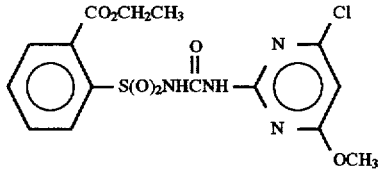

I (ethyl 2-[[[[(4-chloro-6-methoxy-2-pyrimidinyl)amino]carbonyl]amino]sulfonyl]benzoate, chlorimuron ethyl) and agriculturally suitable salts thereof with the triazolinone of Formula II

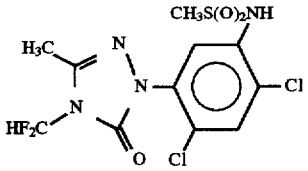

II (N-[2,4-dichloro-5-[4-(difluoromethyl)-4,5-dihydro-3-methyl-5-oxo-1H-1,2,4-triazol-1-yl]phenyl]methanesulfonamide, sulfentrazone), which have now been discovered to synergistically control weeds. This invention also relates to herbicidal compositions comprising effective amounts of the aforesaid mixtures and at least one of the following: surfactant, solid or liquid diluent. This invention also relates to a method for controlling undesired vegetation comprising applying to the locus of the vegetation herbicidally effective amounts of the aforesaid mixtures.

For reason of weed control spectrum and/or crop selectivity, the preferred crop for application of the mixtures of this invention is soybean.

DETAILS OF THE INVENTION

The Formula I compound is prepared as described in U.S. Pat. No. 4,547,215. The synthesis involves the reaction of the sulfonyl isocyanate of Formula 1 with the heterocyclic amine of Formula 2.

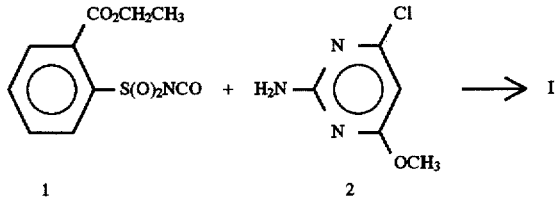

The mixtures of the present invention can include the sulfonylurea of Formula I as one or more of its agriculturally suitable salts. These can be prepared in a number of ways known in the art. For example, metal salts can be made by contacting the sulfonylurea of Formula I with a solution of an alkali or alkaline earth metal salt having a sufficiently basic anion (e.g., hydroxide, alkoxide, carbonate or hydride). Quaternary amine salts can be made by similar techniques.

Salts of the sulfonyl urea of Formula I can also be prepared by exchange of one cation for another. Cationic exchange can be effected by direct contact of an aqueous solution of a salt of the sulfonylurea of Formula I (e.g., alkali or quaternary amine salt) with a solution containing the cation to be exchanged. This method is most effective when the desired salt containing the exchanged cation is insoluble in water and can be separated by filtration.

Exchange may also be effected by passing an aqueous solution of a salt of the sulfonylurea of Formula I (e.g., an alkali metal or quaternary amine salt) through a column packed with a cation-exchange resin containing the cation to be exchanged for that of the original salt and the desired product is eluted from the column. This method is particularly useful when the desired salt is water soluble (e.g., a potassium, sodium or calcium salt).

The Formula II triazolinone can be prepared by methods described in U.S. Pat. No. 4,818,275 which involve the reaction of the aniline of Formula 3 with methanesulfonyl chloride (Formula 4) in the presence of a base like triethylamine in a solvent like dichloromethane.

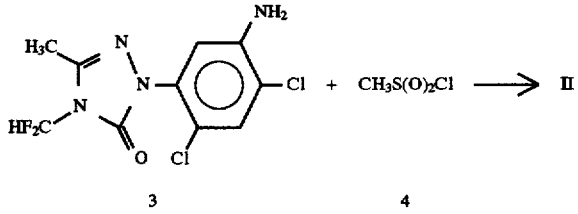

Formulation/Utility

The mixtures of the Formula I and Formula II compounds can be formulated in a number of ways:

(a) the Formula I and Formula II compounds can be formulated separately and applied separately or applied simultaneously in an appropriate weight ratio, e.g., as a tank mix; or (b) the Formula I and Formula II compounds can be formulated together in the proper weight ratio.

Mixtures of the Formula I and Formula II compounds will generally be used as a formulation with an agriculturally suitable carrier comprising a liquid or solid diluent and/or a surfactant wherein the formulation is consistent with the physical properties of the active ingredients, mode of application and environmental factors such as soil type, moisture and temperature. Useful formulations include liquids such as solutions (including emulsifiable concentrates), suspensions, emulsions (including microemulsions and/or suspoemulsions) and the like which optionally can be thickened into gels. Useful formulations further include solids such as dusts, powders, granules, pellets, tablets, films, and the like which can be water-dispersible ("wettable") or water-soluble. Active ingredients can be (micro) encapsulated and further formed into a suspension or solid formulation; alternatively the entire formulation of active ingredient can be encapsulated (or "overcoated"). Encapsulation can control or delay release of the active ingredients. Sprayable formulations can be extended in suitable media and used at spray volumes from about one to several hundred liters per hectare. High-strength compositions are primarily used as intermediates for further formulation.

The formulations will typically contain effective amounts of active ingredients, diluent and surfactant within the following approximate ranges which add up to 100 percent by weight.

| | Weight Percent | | |
|---|---|---|---|
| | Active Ingredient | Diluent | Surfactant |
| Water-Dispersible and Water-soluble Granules, Tablets and Powders. | 5–90 | 0–94 | 1–15 |
| Suspensions, Emulsions, Solutions (including Emulsifiable Concentrates) | 5–50 | 40–95 | 0–15 |
| Dusts | 1–25 | 70–99 | 0–5 |
| Granules and Pellets | 0.01–99 | 5–99.99 | 0–15 |
| High Strength Compositions | 90–99 | 0–10 | 0–2 |

Typical solid diluents are described in Watkins; et al., *Handbook of Insecticide Dust Diluents and Carriers,* 2nd Ed., Dorland Books, Caldwell, N.J. Typical liquid diluents are described in Marsden, *Solvents Guide,* 2nd Ed., Interscience, New York, 1950. *McCutcheon's Detergents and Emulsifiers Annual,* Allured Publ. Corp., Ridgewood, N.J., as well as Sisely and Wood, *Encyclopedia of Surface Active Agents*, Chemical Publ. Co., Inc., New York, 1964, list surfactants and recommended uses. All formulations can contain minor amounts of additives to reduce foam, caking, corrosion, microbiological growth and the like, or thickeners to increase viscosity.

Surfactants include, for example, polyethoxylated alcohols, polyethoxylated alkylphenols, polyethoxylated sorbitan fatty acid esters, dialkyl sulfosuccinates, alkyl sulfates, alkylbenzene sulfonates, organosilicones, N,N-dialkyltaurates, lignin sulfonates, naphthalene sulfonate formaldehyde condensates, polycarboxylates, and polyoxyethylene/polyoxypropylene block copolymers. Solid diluents include, for example, clays such as bentonite, montmorillinite, attapulgite and kaolin, starch, sugar, silica, talc, diatomaceous earth, urea, calcium carbonate, sodium carbonate and bicarboixate, and sodium sulfate. Liquid diluents include, for example, water, N,N-dimethylformamide, dimethyl sulfoxide, N-alkylpyrrolidone, ethylene glycol, polypropylene glycol, paraffins, alkylbenzenes, alkylnaphthalenes, oils of olive, castor, linseed, tung, sesame, corn, peanut, cotton-seed, soybean, rape-seed and coconut, fatty acid esters, ketones such as cyclohexanone, 2-heptanone, isophorone and 4-hydroxy-4-methyl-2-pentanone, alcohols such as methanol, cyclohexanol, decanol and tetrahydrofurfuryl alcohol.

Solutions, including emulsifiable concentrates, can be prepared by simply mixing the ingredients. Chemically stabilized aqueous sulfonylurea or agriculturally suitable sulfonylurea salt dispersions are taught in U.S. Pat. No. 4,936,900. Solution formulations of sulfonylureas with improved chemical stability are taught in U.S. Pat. No. 4,599,412. Dusts and powders can be prepared by blending and, usually, grinding as in a hammer mill or fluid-energy mill. Suspensions are usually prepared by wet-milling; see, for example, U.S. Pat. No. 3,060,084. Granules and pellets can be prepared by spraying the active material upon preformed granular carders or by agglomeration techniques. See Browning, "Agglomeration", *Chemical Engineering,* Dec. 4, 1967, pp 147–48, *Perry's Chemical Engineer's Handbook,* 4th Ed., McGraw-Hill, New York; 1963, pages 8–57 and following, and WO 91/13546; Pellets can be prepared as described in U.S. Pat. No. 4,172,714. Water-dispersible and water-soluble granules can be prepared as taught in U.S. Pat. No. 4,144,050, U.S. Pat. No. 3,920,442 and DE 3,246,493. Tablets can be prepared as taught in U.S. Pat. No. 5,180,587, U.S. Pat. No. 5,232,701 and U.S. Pat. No. 5,208,030. Fills can be prepared as taught in GB 2,095,558 and U.S. Pat. No. 3,299,566.

For further information regarding formulation, see U.S. Pat. No. 3,235,361, Col. 6, line 16 through Col. 7, line 19 and Examples 10–41; U.S. Pat. No. 3,309,192, Col. 5, line 43 through Col. 7, line 62 and Examples 8, 12, 15, 39, 41, 52, 53, 58, 132, 138–140, 162–164, 166, 167 and 169–182; U.S. Pat. No. 2,891,855, Col. 3, line 66 through Col. 5, line 17 and Examples 1–4; Klingman, *Weed Control as a Science,* John Wiley and Sons, Inc., New York, 1961, pp 81–96; and Hance et al., *Weed Control Handbook,* 8th Ed., Blackwell Scientific Publications, Oxford, 1989.

In the following Examples, all percentages are by weight and all formulations are prepared in conventional ways. Compound numbers refer to compounds identified on Page 8.

EXAMPLE A

| High Strength Concentrate | |
|---|---|
| Compound 1 | 4.7% |
| Compound 2 | 93.8% |
| silica aerogel | 0.5% |
| synthetic amorphous fine silica | 1.0%. |

EXAMPLE B

| Wettable Powder | |
|---|---|
| Compound 1 | 0.9% |
| Compound 2 | 64.1% |
| dodecylphenol polyethylene glycol ether | 2.0% |
| sodium ligninsulfonate | 4.0% |
| sodium silicoaluminate | 6.0% |
| montmorillonite (calcined) | 23.0%. |

EXAMPLE C

| Granule | |
|---|---|
| Compound 1 | 0.4% |
| Compound 2 | 9.6% |
| attapulgite granules (low volatile matter, 0.71/0.30 mm; U.S.S. No. 25–50 sieves) | 90.0%. |

EXAMPLE D

| Aqueous Suspension | |
|---|---|
| Compound 1 | 0.4% |
| Compound 2 | 24.6% |
| hydrated attapulgite | 3.0% |
| crude calcium ligninsulfonate | 10.0% |
| sodium dihydrogen phosphate | 0.5% |
| water | 61.5%. |

EXAMPLE E

| Extruded Pellet | |
|---|---|
| Compound 1 | 0.5% |
| Compound 2 | 24.5% |
| anhydrous sodium sulfate | 10.0% |
| crude calcium ligninsulfonate | 5.0% |
| sodium alkylnaphthalenesulfonate | 1.0% |
| calcium/magnesium bentonite | 59.0%. |

Test results indicate that mixture of compounds of Formula I and Formula II are highly active herbicides, providing unexpected synergistic control of selected grass and broadleaf weeds. The mixtures are valued, because they retain acceptable levels of crop selectivity in certain agronomic crops such as soybean and corn. The mixtures are particularly valued because of acceptable level of crop selectivity they retain in soybeans.

The Formula I and Formula II mixtures of this invention can additionally be used in combination with other commercial herbicides, insecticides or fungicides. A mixture of one or more additional herbicides with the Formula I and Formula II mixtures of this invention may be particularly useful for weed Control. Examples of other herbicides as mixture partners are: acetochlor, acifluoren, alachlor, atrazine, benazolin, bentazon, butylate, methyl [[2-chloro-4-fluoro-5-[(5,6,7,8-tetrahydro-3-oxo-1H,3H-[1,3,4]thiadiazolo[3,4-a]pyridazin-1-ylidene)amino]phenyl]thio]acetate, clethodim, clomazone, clopyralid, cloransulam-methyl, cyanazine, 2,4-D, 2,4-DB, dicamba, α,2-dichloro-5-[4-(difluoromethyl)-4,5-dihydro-3-methyl-5-oxo-1H-1,2,4-triazol-1-yl]4-fluorobenzenepropanoate, 2-[4,5-dihydro-4-methyl-4-(1-methylethyl)-5-oxo-1H-imidazol-2-yl]-5-(methoxylmethyl)-3-pyridinecarboxylic acid, dimethenamid, EPTC, ethalfluralin, fenoxaprop, fluazifop, fluazifop-P, flumetsulam, fluminclorac pentyl ester, flumioxazin, fomesafen, glufosinate, glyphosate, halosulfuron, haloxyfop, imazaquin, imazethapyr, isoxaflutole, lactofen, linuron, MCPA, N-[[(4-methoxy-6-methyl-1,3,5-triazin-2-yl)amino]carbonyl]-2-(3,3,3-trifluoropropyl)benzenesulfonamide, metolachlor, metribuzin, mefluidide, nicosulfuron, 3-oxetanyl 2-[[[[(4,6-dimethyl-2-pyrimidinyl)amino]carbonyl]amino]sulfonyl]benzoate, paraquat, pendimethalin, primisulfuron, pyridate, quizalofop-ethyl, quizalofop-P-ethyl, sethoxydim, simazine, sulcotdone, thiafluamide, thiensulfuron, tridiphane, trifluralin, vernolate.

A herbicidally effective amount of both compounds of Formula I and Formula II will vary depending on the specific compounds selected, environmental conditions, formulation, method of application, amount and type of vegetation present, etc. The use ratios of Formula I and Formula II are in general 1:20 to 1:75, with ratios of 1:25 to 1:60 preferred for most uses. A ratio of 1:50 is particularly preferred. In general, the herbicidally effective amount of the Formula I compound is a rate from 0.0005 to 1 kg ai/ha, and the herbicidally effective amount of the Formula II compound is a rate from 0.001 to 2 kg ai/ha. Preferably, the herbicidally effective amount of the Formula I compound is a rate from 0.001 to 0.5 kg ai/ha, and herbicidally effective amount of the Formula II compound is a rate of 0.01 to 1 kg ai/ha. One skilled in the art can readily determine application rates and ratios of the herbicide of Formula I to the herbicide of Formula II as well as timing necessary for the desired level of weed control and crop safety.

The following Formula I sulfonylurea (Compound 1) was tested in combination with the Formula II triazolinone (Compound 2).

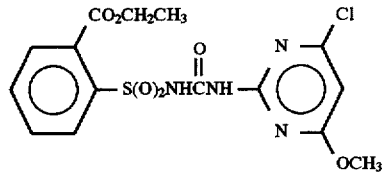

Compound 1

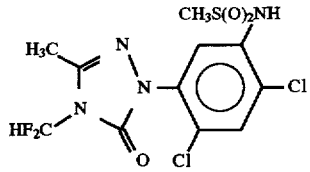

Compound 2

The following test protocol was used for the tests in Tables 1 and 2. The data demonstrate the efficacy of the Formula I and Formula II mixtures of this invention against specific weeds. The weed control afforded by the mixtures of this invention are not limited, however, to these species.

Test Protocol

Soybeans (*Glycine max*, GLXMA), corn (*Zea mays*, ZEAMX), cocklebur (*Xanthium strumarium*, XANTH), and velvetfleaf (*Abutilon theophrasti*, ABUTH) were planted in 20-cm diameter pots which contained a sandy loam soil with 1.4% organic matter or silt loam soil with 3.5% organic matter. Compound 1 was formulated as a single active ingredient in 26.9% dry flowable granules, and Compound 2 was formulated as a single active ingredient in 79.6% dry flowable granules. Compounds I and 2 were applied preemergence to the soil surface of pots alone and as a mixture in a ratio of 1:46.7. Formulated herbicides of Compounds 1 and 2 were diluted in an aqueous solution to the appropriate concentration to deliver the desired use rate. Treatments were applied using a stationary laboratory circulating belt sprayer which was calibrated to deliver 280 L/ha through a single nozzle. Individual treatments were replicated three times and treatments were positioned in a greenhouse in a randomized complete block design. Natural light in the greenhouse was supplemented with artificial light to achieve a photoperiod of 14 hr.

Assessments of weed control and crop injury were made by visually evaluating plants at 21 days after treatment. Visual rating was made using a 0 to 100% scale where 0% represents no difference relative to an untreated control and 100% represents complete kill of the given crop or weed species.

Colby's equation was used to calculate the expected additive herbicidal effect of the mixtures of Compound 1 and Compound 2. Colby's equation (Colby, S. R. "Calculating Synergistic and Antagonistic Responses of Herbicide Combinations," *Weeds*, 15(1), pp 20–22 (1967)) calculates the expected additive effect of herbicidal mixtures, and for two active ingredients is of the form:

$$P_{a+b}=P_a+P_b-(P_aP_b/100)$$

wherein $P_{a+b}$ is the percentage effect of the mixture expected from additive contribution of the individual components, $P_a$ is the observed percentage effect of the first active ingredient at the same use rate as in the mixture, and $P_b$ is the observed percentage effect of the second active ingredient at the same use rate as in the mixture.

Tables 1 and 2 represent final assessment of weed control and crop injury at 21 days after treatment with Compound 1 and Compound 2 applied alone as single active ingredients, applied as a mixture of the two active ingredients of Compound 1 and Compound 2, and the expected additive effect of the herbicidal mixture of Compound 1 and Compound 2 (Colby's equation). Different ratios of Compound 1 to Compound 2, and different formulation types, also provide useful weed control from the combination of the two herbicides.

TABLE 1

Effect of Compound 1 and Comound 2 as active ingredients alone and in a mixture on *Glycine max* (GLXMA), *Zea mays* (ZEAMX), *Xanthium strumarium* (XANTH), and *Abutilon theophrasti* (ABUTH) in a sandy loam soil containing 1.4% organic matter.

| Com- | | Evaluation 21 days after treatment | | | |
|---|---|---|---|---|---|
| | | % Injury | | % Control | |
| pound | Rate (g ai/ha) | GLXMA | ZEAMX | XANTH | ABUTH |
| 1 | 0.19 | 0 | 30 | 15 | 30 |
| | 0.28 | 0 | 47 | 0 | 40 |
| | 0.38 | 0 | 30 | 7 | 30 |
| | 0.56 | 0 | 40 | 20 | 27 |
| | 0.75 | 0 | 47 | 20 | 40 |
| | 1.5 | 3 | 57 | 67 | 57 |
| 2 | 8.8 | 0 | 0 | 0 | 0 |
| | 13.1 | 0 | 0 | 0 | 3 |
| | 17.5 | 0 | 3 | 0 | 10 |
| | 26.2 | 0 | 0 | 0 | 7 |
| | 35 | 0 | 10 | 5 | 10 |
| | 70 | 0 | 13 | 35 | 37 |
| 1 + 2 | 0.19 ± 8.8 | 0 (0)* | 27 (30) | 3 (15) | 17 (30) |
| | 0.28 + 13.1 | 0 (0) | 27 (47) | 20 (0) | 37 (42) |
| | 0.38 + 17.5 | 0 (0) | 30 (32) | 10 (7) | 40 (37) |
| | 0.56 + 26.2 | 5 (0) | 47 (40) | 33 (20) | 73 (32) |
| | 0.75 + 35 | 3 (0) | 50 (52) | 50 (24) | 73 (46) |
| | 1.5 + 70 | 7 (3) | 53 (63) | 97 (79) | 87 (73) |

*Expected effects in parentheses are calculated according to Colby, S. R., "Calculating Synergistic and Antagonistic Responses of Herbicide Combination," Weeds, 15 (1), pp 20–22 (1967).

TABLE 2

Effect of Compound 1 and Comound 2 as active ingredients alone and in a mixture on *Glycine max* (GLXMA), *Zea mays* (ZEAMX), *Xanthium strumarium* (XANTH), and *Abutilon theophrasti* (ABUTH) in a silt loam soil containing 3.5% organic matter.

| Com- | | Evaluation 21 days after treatment | | | |
|---|---|---|---|---|---|
| | | % Injury | | % Control | |
| pound | Rate (g ai/ha) | GLXMA | ZEAMX | XANTH | ABUTH |
| 1 | 0.75 | 0 | 27 | 0 | 13 |
| | 1.1 | 3 | 27 | 20 | 20 |
| | 1.5 | 3 | 47 | 25 | 27 |
| | 2.2 | 10 | 50 | 87 | 37 |
| | 3 | 10 | 67 | 83 | 47 |
| | 6 | 7 | 63 | 73 | 67 |
| 2 | 35 | 0 | 0 | 25 | 13 |
| | 42.5 | 0 | 3 | 20 | 15 |

TABLE 2-continued

Effect of Compound 1 and Comound 2 as active ingredients alone and in a mixture on *Glycine max* (GLXMA), *Zea mays* (ZEAMX), *Xanthium strumarium* (XANTH), and *Abutilon theophrasti* (ABUTH) in a silt loam soil containing 3.5% organic matter.

| Com- | | Evaluation 21 days after treatment | | | |
|---|---|---|---|---|---|
| | | % Injury | | % Control | |
| pound | Rate (g ai/ha) | GLXMA | ZEAMX | XANTH | ABUTH |
| | 70 | 0 | 7 | 27 | 97 |
| | 105 | 13 | 33 | 77 | 83 |
| | 140 | 23 | 43 | 100 | 100 |
| | 280 | 63 | 90 | 100 | 100 |
| 1 + 2 | 0.75 + 35 | 0 (0)* | 20 (27) | 90 (25) | 67 (24) |
| | 1.1 + 42.5 | 10 (3) | 43 (29) | 80 (36) | 70 (32) |
| | 1.5 + 70 | 0 (3) | 37 (51) | 8 (45) | 80 (98) |
| | 2.2 + 105 | 13 (22) | 27 (67) | 77 (97) | 80 (89) |
| | 3 + 140 | 30 (31) | 47 (81) | 97 (100) | 93 (100) |
| | 6 + 280 | 77 (66) | 67 (96) | 100 (100) | 100 (100) |

*Expected effects in parentheses are calculated according to Colby, S. R., "Calculating Synergistic and Antagonistic Responses of Herbicide Combination," Weeds, 15 (1), pp 20–22 (1967).

What is claimed is:

1. A herbicidal mixture comprising the compound of Formula I

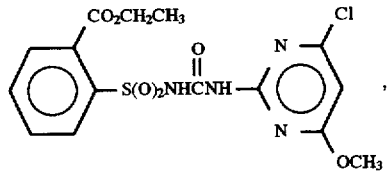

I which is ethyl 2-[[[[(4-chloro-6-methoxy-2-pyrimidinyl) amino]carbonyl]amino]sulfonyl]benzoate (chlorimuron ethyl) and agriculturally suitable salts thereof and the compound of Formula II

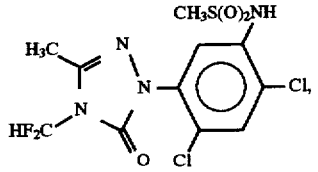

II which is N-[2,4-dichloro-5-[4-(difluoromethyl)-4,5-dihydro-3-methyl-5-oxo-1H-1,2,4-triazol-1-yl]phenyl] methanesulfonamide (sulfentrazone), wherein the ratio of the compound of Formula I to the compound of Formula II is in the range of 1:20 to 1:75.

2. An agriculturally suitable composition for controlling the growth of undesired vegetation comprising an effective amount of the herbicidal mixtures of claim 1 and at least one of the following: surfactant, solid or liquid diluent.

3. The composition of claim 2 wherein the undesired vegetation is the vegetation in a soybean crop.

4. A method for controlling the growth of undesired vegetation comprising contacting the locus to be protected with a herbicidally effective amount of the composition of claim 2.

5. The method of claim 4 wherein the locus to be protected is a soybean crop.

* * * * *